Patented Mar. 23, 1937

2,074,492

UNITED STATES PATENT OFFICE 2,074,492

MEDICINAL COMPOUND

Wilbur Willis Swingle and Joseph John Pfiffner, Princeton, N. J., assignors to Parke, Davis & Company, Detroit, Mich., a corporation of Michigan No Drawing. Application August 28, 1930
Serial No. 478,558

7 Claims. (Cl. 167—77)

The invention relates to an extract obtainable from mammalian suprarenal glands and a method of preparing the same. More particularly the invention pertains to an extract from the suprarenal cortex containing in concentrated form the active principle or hormone of the adrenal cortex.

The object of our invention is to obtain a product which can be used as a substitute for adrenal cortex and when administered to an animal suffering from adrenal insufficiency due to the complete operative removal of the suprarenal glands, will alleviate all symptoms of adrenal insufficiency and thus enable the practice of replacement therapy.

Another object of our invention is to provide an improved process for treating the cortex of mammalian suprarenal glands whereby the active principle or hormone may be obtained in a concentrated form useful for animal and human therapy in cases of deficient functioning of the adrenal cortex.

A further object is to obtain a practically pure extract of adrenal cortex, free from injurious substances including inert associated gland tissue, proteins, salts, lipoids and substantially free of adrenalin.

These and other objects are attained by treating mammalian suprarenal glands in the manner hereinafter set forth.

In general our improved process consists in subjecting fresh mammalian suprarenal cortex to a series of extractions by organic reagents so selected as to successively remove from the starting material the various substances associated with the hormone, finally leaving a product containing the active principle in a purified state and in high concentration.

We have found that the active principle or hormone of the suprarenal cortex can be extracted from the gland material by means of lipoid solvents such as benzol, sulphuric ether, petroleum ether, etc., but the active principle itself is not a fat and may be separated from fats and cholesterol-like compounds and be obtained in a water-soluble form. The use of a lipoid solvent for the extraction of the hormone has the advantage that proteins and adrenalin are readily removed.

In the extraction of the product we prefer to apply first an organic solvent which is also soluble in water, as for example ethyl alcohol, propyl alcohol, acetone, etc., and then to subject the extracted material after removal of the water-soluble solvent to a more typical lipoid solvent such as benzol, petroleum ether, carbon tetra chloride, etc. Under proper mechanical conditions the comminuted gland tissue can be extracted directly with a water-insoluble solvent like benzol but on a laboratory scale we prefer the sequence of two extractive agents, one being an organic solvent soluble in water and the second an organic solvent insoluble in water.

The lipoid fractions thus obtained contain the active principle necessary for maintaining the life of suprarenalectomized animals (cats or dogs) but they possess certain disadvantages due to the presence of lipoidal impurities. We have found, however, that the phospholipids can be separated in the recognized way, using acetone, without loss of the active principle.

We have been able also to separate the hormone from fats and cholesterol by an elaborate system of selective distribution between suitable solvents, such as between petroleum ether and aqueous alcohol. The major part of the cholesterol and neutral fat is then found in the hydrocarbon solvent and the major part of the active principle or hormone in the alcohol-water layer.

We have demonstrated that the active principle is comparatively stable and not readily destroyed under the conditions of the process that we have devised.

While our process is capable of being carried out in various specific ways falling under the general steps outlined above, we have succeeded in making a very potent extract by means of the following process. For convenience, the directions hereinafter given are based upon a lot of adrenal cortex weighing 2800 to 3500 grams.

The adrenal glands from cattle are obtained from the animals immediately after slaughter and are packed in ice until ready for processing which should preferably take place within twenty-four hours. The connective tissue and extraneous fat are removed, the glands split lengthwise, and the medullary tissue scraped out. The cortical tissue is then passed through an ordinary meat grinder using the finest cutter.

*Preparation of crude alcoholic extract*

The ground cortical tissue is placed into an earthenware jar and 2½ volumes of 95% ethyl alcohol added. It is allowed to stand at room temperature with occasional stirring for three to six days, after which it is strained through muslin and the residue expressed in a tincture press. The liquid product is then filtered through soft paper. The gland residue is reground and extracted in a similar manner for three days with 2 volumes of 80% ethyl alcohol. The alcoholic extracts are concentrated separately in partial vacuo at external temperature 50–60° C. to about 1/15 their original volumes.

Removal of proteins, much inert material, and most of the adrenalin

From this stage on all material is kept in the refrigerator except when under manipulation. Each aqueous residue obtained above (volume about 500 cc.) is transferred at once to a liter cylinder with 500 cc. benzene. After thorough mixing the material is placed in the refrigerator to settle. The benzene solution is removed by syphon and the aqueous residue washed twice more. The last benzene washing is colorless or only slightly yellow. The benzene washings are all combined. Preferably a large centrifuge is used to separate the benzene extract. The benzene is completely removed in partial vacuo at external temperature 45–50° C. using a two liter balloon flask and allowing the material to enter the flask as rapidly as the benzene distils. This benzene can be used repeatedly for the same purpose without any purification.

Removal of phospholipids

To the residue in the flask is added 500 cc. acetone. The material is rubbed thoroughly with a heavy bent glass rod and set aside in the refrigerator for twenty-four hours with occasional rubbing. The acetone solution is then decanted and the residue reextracted in the same manner. After decanting the second acetone extractives the residue is transferred to a mortar and rubbed with five 100 cc. portions of fresh cold acetone. The acetone extractives are combined, filtered and the acetone removed in partial vacuo at 45–50° C. external temperature.

Removal of cholesterol and neutral fat

The residue is transferred to a separatory funnel with 30 cc. petroleum ether (B. P. 30 or 40–60°) and 74 cc. 95% ethyl alcohol. 26 cc. distilled water are added and the contents gently mixed. The 70% alcoholic solution which separates is washed 5 times with 30 cc. portions of petroleum ether. The petroleum ether solution and washings are returned to the original flask and the petroleum ether removed in partial vacuo at external temperature 40–50° C. The above procedure is repeated. The petroleum ether solution resulting from the second distribution is run into another funnel, 74 cc. of 95% alcohol added and then 26 cc. distilled water. The petroleum ether solution resulting from the third distribution is run into another funnel 74 cc. of 95% alcohol added and then 26 cc. distilled water. This gives a total of 4 distributions. The alcoholic solutions are washed successively 5 times with 30 cc. portions of petroleum ether in the order, 2nd, 3rd, and 4th distributions. The alcoholic solutions of the 3rd and 4th distributions are then washed twice with fresh 30 cc. portions of petroleum ether. (Rather stable emulsions will be encountered unless the material is handled gently during the distributions).

The alcoholic solutions are combined, the alcohol removed in partial vacuo at 45–50° C. external temperature. Distillation is continued to a volume of about ⅔ of the final volume of the extract. The volume is made up with distilled water so that 1 cc. represents 30 grams of fresh cortex and allowed to stand in refrigerator overnight. The product is centrifuged at a fairly high speed for 30 minutes. The extract is carefully decanted from the black oily appearing material which is thrown down and passed through a large Seitz filter.

The extract of suprarenal cortex

The extract made in accordance with the procedure outlined above contains the internal secretion or hormone characteristic of the suprarenal cortex of mammalia and is practically free from injurious substances including inert gland tissue, proteins, salts, lipoids and adrenalin, in fact we have reduced the extractive material from 30 grams of fresh gland tissue to less than 0.01 gram of water-soluble fraction which can be injected therapeutically without any objectionable reaction.

The physiological properties of the extract are best shown by tests which have been made on laboratory animals such as bilaterally adrenalectomized cats. It is a well established fact that the life of a cat after such operation is seldom more than 8 to 10 days and heretofore it has been impossible to extend the life of such animals for any appreciable span by the administration of any known substance, or by any known treatment. However, the daily subcutaneous administration of our extract in amounts from 0.5 to 1.0 cc. per kilogram of body weight has resulted in maintaining the life span for 100 days or more following adrenalectomizing in every instance, and there has been no indication that this life span might not be prolonged indefinitely by the same treatment. On the other hand, cats which appeared normal during the administration of our extract showed the characteristic symptoms of adrenal insufficiency as soon as the administration of the extract was discontinued, and death always resulted within 8 to 10 days of this time. Therefore it has been definitely shown that our extract has physiological properties corresponding to the hormone of the suprarenal cortex.

Our extract has also been used in human therapy in cases where deficiency in suprarenal cortex was indicated and it has had beneficial effects in such cases.

What we claim as our invention is:

1. A process for obtaining an active extract from the cortical portion of the suprarenal glands in concentrated form and sufficiently free from impurities to have the physiological characteristic of alleviating symptoms of adrenal insufficiency which comprises extraction of fresh suprarenal cortex with an alcohol capable of dissolving the active substance without destroying the activity thereof, separating the solvent from the solid matter, removal of the alcohol solvent, extraction of the resulting residue with a liquid hydrocarbon of low molecular weight capable of dissolving the active substance without destroying the same and incapable of dissolving substantial amounts of proteins, salts or adrenalin, separation of the solution from the solid matter, removal of said hydrocarbon solvent, extraction of the residue with acetone capable of dissolving the active substance and preserving the activity thereof and incapable of dissolving substantial portions of phospholipids, removal of the solution from the solid matter, removal of said acetone, treatment of the residue with two immiscible reagents aqueous alcohol and petroleum ether respectively capable of separating by distribution the active substance from portions of neutral-fat, adrenalin and other impurities, removal of the aqueous alcohol containing the active principle from the petroleum ether, removing the alcohol leaving an aqueous solution, separation of the aqueous solution from solid matter, and sterilization of said solution.

2. A process for obtaining an active extract from the cortical portion of the suprarenal glands in concentrated form and sufficiently free from impurities to have the physiological characteristic of alleviating symptoms of adrenal insufficiency which comprises extraction of fresh suprarenal cortex with an alcohol capable of dissolving the active substance without destroying the activity thereof, separating the solvent from the solid matter, removal of the alcohol solvent, extraction of the resulting solution with benzene capable of dissolving the active substance without destroying the same and incapable of dissolving substantial amounts of proteins, salts or adrenalin, separation of the solution from the solid matter, removal of said benzene solvent, extraction of the residue with acetone capable of dissolving the active substance and preserving the activity thereof and incapable of dissolving substantial portions of phospholipids, removal of the solution from the solid matter, removal of said acetone solvent, treatment of the residue with two immiscible reagents capable of separating by distribution the active substance from portions of neutral-fat, adrenalin and other impurities, said reagents comprising petroleum ether on the one hand and a mixture of alcohol and water on the other hand, removal of the alcohol and water reagent containing the active principle from the other immiscible reagent, removal of the alcohol leaving an aqueous solution containing the active substance, separation of the solution from solid matter and sterilization of said solution.

3. The process for obtaining an extract of the cortical hormone from the suprarenal glands comprising treating suprarenal cortex tissue with an organic lipoid solvent of the class consisting of benzol, sulphuric ether, petroleum ether and carbon tetrachloride, removing said solvent leaving a residue, treating said residue with acetone to precipitate lipoids, removing said acetone leaving a residue and subjecting the last mentioned residue to a fractional distribution between aqueous alcohol and petroleum ether, thereby obtaining the cortical hormone in the aqueous alcohol.

4. The process for obtaining an extract of the cortical hormone from the suprarenal glands comprising successively treating suprarenal cortex tissue with each of three solvents, the first of said solvents being of the class consisting of ethyl alcohol, propyl alcohol, and acetone, the second of said solvents being of the class consisting of benzol, sulphuric ether, petroleum ether and carbon tetrachloride and the third of said solvents being acetone, separating the solution from the precipitate after each of said solvent treatments, removing the solvent after each of said separations, and subjecting the residue remaining after the removal of said third solvent to a fractional distribution between aqueous alcohol and petroleum ether, thereby obtaining the cortical hormone in the aqueous alcohol.

5. The process for obtaining an extract of the cortical hormone from the suprarenal glands comprising treating suprarenal cortex tissue with alcohol, separating the solution from the solid matter, removing the alcohol from the solution, treating the product after alcohol removal with benzene, separating the solution from the solid matter, removing the benzene from said solution, treating the product after benzene removal with acetone, separating the solution from the solid matter, removing the acetone from said solution and subjecting the product remaining after said acetone removal to repeated distributions between aqueous alcohol and petroleum ether, combining the aqueous alcohol fractions, removing the alcohol leaving an aqueous solution and separating the aqueous solution from the solid matter.

6. An extract of the suprarenal cortex derived from the cortical portion of the suprarenal glands, said extract being a clear pale-yellow solution containing the cortical hormone sufficiently free from epinephrine and other impurities to be suitable for subcutaneous, intraperitoneal or intravenous injection of human beings suffering from Addison's disease in sufficient quantities to combat adrenal cortex insufficiency, said extract being sufficiently potent to permit adrenal cortex replacement therapy in bilaterally adrenalectomized animals and to maintain the lives of said animals for over 100 days following adrenalectomy and to restore to normal conditions animals prostrated by adrenal cortex deficiency.

7. An extract of the suprarenal cortex derived from the cortical portion of the suprarenal glands, said extract when in solution form being a clear solution containing the cortical hormone sufficiently free from epinephrine and other impurities to be suitable for subcutaneous, intraperitoneal or intravenous injection of human beings suffering from Addison's disease in sufficient quantities to combat adrenal cortex insufficiency, said extract being sufficiently potent to permit adrenal cortex replacement therapy in bilaterally adrenalectomized animals and to maintain the lives of said animals for over 100 days following adrenalectomy and to restore to normal conditions animals prostrated by adrenal cortex deficiency.

WILBUR WILLIS SWINGLE.
JOSEPH JOHN PFIFFNER.